Dec. 4, 1934.   A. S. PAUL   1,983,485
WINDSHIELD HEATER
Filed April 15, 1932
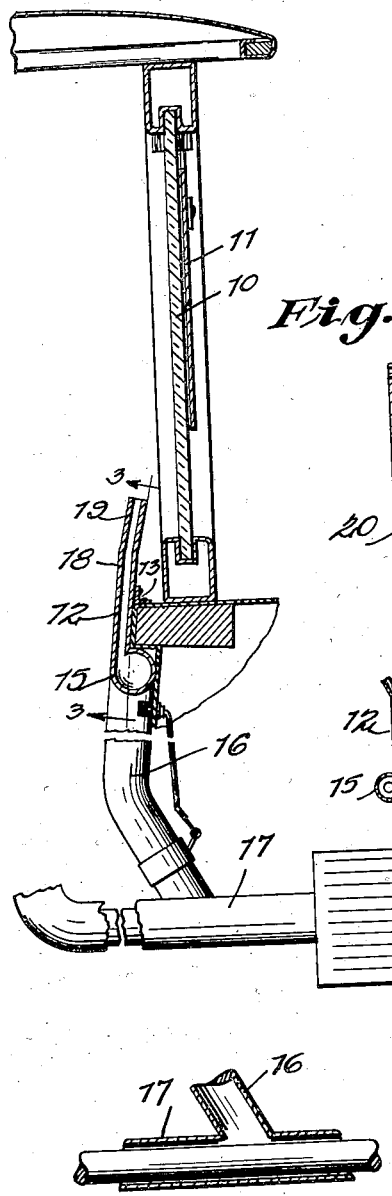
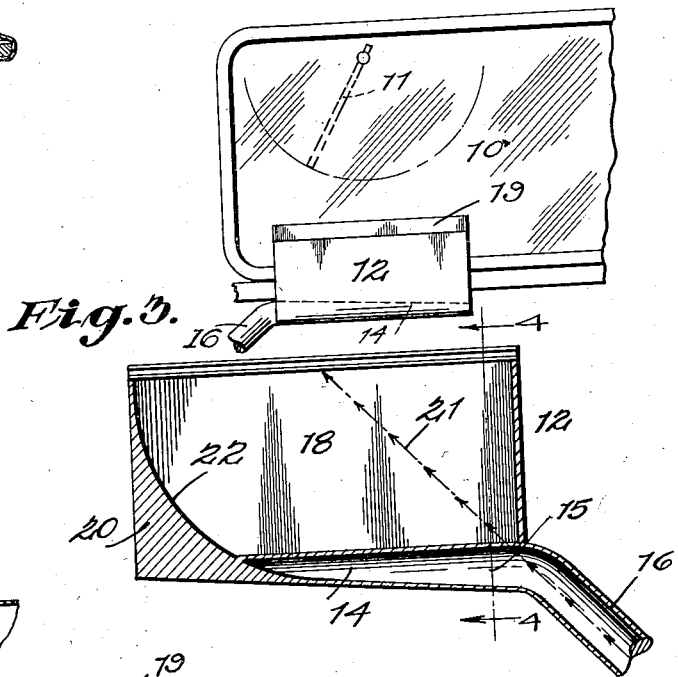
Fig.1. Fig.2. Fig.3. Fig.4. Fig.5. Fig.6.
Inventor
Abraham S. Paul
By Murray W. Gould
Attorney Patented Dec. 4, 1934

1,983,485

UNITED STATES PATENT OFFICE 1,983,485

WINDSHIELD HEATER

Abraham S. Paul, Brooklyn, N. Y.

Application April 15, 1932, Serial No. 605,535

3 Claims. (Cl. 299—154)

The primary object of my invention is to heat the same surface or area as covered by the usual type of windshield wipers, by directing a current of hot air from the exhaust pipe casing against this area and insuring an equal distribution of this hot air along the outlet and then against the wiper area.

I have found that in extremely severe storms, the ordinary types of heaters fail to remove the collection of snow or ice from the windshield. In order to prevent this, I have devised a deflector, which can be attached to the dash and so constructed as to permit of the maximum flow of hot air towards the wiper area.

In order to insure the maximum amount of heated air, I have used a conduit that encircles the exhaust pipe and is provided with a flared inlet, located directly in front of the fan. The deflector conduit is connected to the exhaust casing directly in front of the muffler. The deflector conduit is provided with a cut-off, the control of which is located on the dash. This heater apparatus allows the greatest amount of hot air to flow into the deflector.

Referring to the drawing:

Figure 1 is a sectional view taken thru the windshield, just back of the downward extending conduit, and also shows part of the heating apparatus.

Figure 2 is a fragmentary elevation of Figure 1 and looking in the same direction as the driver.

Figure 3 is an enlarged sectional view taken on line 3—3 of Figure 1. The arrows in this view indicate the direction of the influx of the heated air.

Figure 4 is a reduced sectional view, taken on the line 4—4 of Figure 3.

Figure 5 is an enlarged perspective view of the deflector.

Figure 6 is a sectional view, showing the connection between the deflector conduit and the exhaust pipe casing.

Referring to the drawing in detail:

10 designates any type of windshield having a windshield wiper 11. The deflector 12 is attached to the windshield of the automobile by any means, as at 13. The deflector 12 consists of a hollow, tapering tube or conduit 14, which is enlarged at 15 and forms the inlet 16 and extends downwardly and is connected to the exhaust pipe casing 17. The deflector tube or conduit 14 is provided with a vertically extending casing 18, which is flanged at 19 so as to deflect the greater amount of the hot air towards the center of the wiper area. The tapering tube 14 is closed at its inner end, as at 20, so as to prevent the accumulation of the heated air at that end, and also aids in the distribution of the remaining amount of the heated air over the entire surface covered by the wiper.

Referring to Figure 3, particular attention is called to the angular relation of the inlet pipe 16 and the conduit 14. The inlet pipe 16 is so disposed as to deflect the heated air in the direction shown by the arrows 21, to the top and center of the deflector casing 18. The angular arrangement of the inlet 16 and the curvature 22 absolutely insures an equal distribution along the outlet of the casing 18.

By means of the heating apparatus and the deflector, I am able to deflect and distribute the maximum amount of heated air against the surface covered by the windshield wiper, so that the driver can, in all kinds of freezing weather, have a clear vision through the windshield of an automobile.

It is apparent from the foregoing description that the operation of controlling the flow of heated air is largely automatic, and that the flow of heated air is always under the control of the operator.

It is believed that the simplicity of my construction and the advantages thereof, will be perfectly apparent to those skilled in the art to which this invention relates, when the foregoing description is read in connection with the accompanying drawing, but it is to be understood that I do not wish to be restricted to the precise details of construction herein set forth and hold myself entitled to make all such changes therefrom as fairly come within the scope of what I claim without departing from the spirit or sacrificing any of the advantages of the invention.

What I claim as new:

1. In a fluid distributing nozzle, a tubular supply conduit formed with two angularly related communicating portions connected by a bend in said conduit, one of said portions tapering from said bend towards its other end, said other end being closed, said tapered portion being provided in its wall with a slot coextensive in length therewith and disposed tangentially with respect to the inner surface of said tapered portion, an elongated member of substantial width secured at one of its sides to said tapered conduit portion, said member having an interior chamber registering with and coextensive in length, thickness and direction with said slot, the interior surface of the end of said chamber adjacent the small end of said tapered conduit portion being formed in a smooth flaring curve from the corresponding end of said slot to the end of a discharge opening in the side of said chamber remote from said slot, said discharge opening being coextensive in length and thickness with said chamber, the portion of said supply conduit other than said tapered portion being so angularly related to said tapered portion and chamber that its projected axis is directed substantially toward the midpoint of said discharge opening.

2. In a fluid distributing nozzle, a supply conduit formed with two angularly related communicating portions, one of said portions being tapered toward its end remote from said other portion, a slot in said tapered portion, a flat elongated hollow casing in registry with said slot, said casing being provided at its opposite end with an elongated orifice coextensive with said casing, the remote end portion of said casing being curved upwardly from said slot to said orifice, said casing being substantially in line with the axis of said other portion extended.

3. In a fluid distributing nozzle, a supply conduit formed with two angularly related communicating portions, one of said portions being tapered toward its end remote from said other portion, a slot in said tapered portion, a flat elongated hollow casing in registry with said slot, said casing being provided at its opposite end with an elongated orifice coextensive with said casing, the remote end portion of said casing being curved upwardly from said slot to said orifice, said casing being substantially in line with the axis of said other portion extended, said casing also provided with a flanged portion intermediate its outer end, a slot in said flanged portion being coextensive in length and width with the orifice in said elongated casing.

ABRAHAM S. PAUL.